(12) United States Patent
Svensson

(10) Patent No.: US 12,404,889 B2
(45) Date of Patent: Sep. 2, 2025

(54) MECHANICAL CONNECTION ARRANGEMENT FOR PANELS

(71) Applicant: Välinge Innovation AB, Viken (SE)

(72) Inventor: Johan Svensson, Kattarp (SE)

(73) Assignee: VÄLINGE INNOVATION AB, Viken (SE)

( * ) Notice: Subject to any disclaimer, the term of this patent is extended or adjusted under 35 U.S.C. 154(b) by 132 days.

(21) Appl. No.: 17/709,994

(22) Filed: Mar. 31, 2022

(65) Prior Publication Data

US 2022/0397140 A1  Dec. 15, 2022

(30) Foreign Application Priority Data

Jun. 11, 2021 (SE) .................................... 2150752-0

(51) Int. Cl.
*F16B 5/00* (2006.01)

(52) U.S. Cl.
CPC .......... *F16B 5/0088* (2013.01); *F16B 5/0024* (2013.01)

(58) Field of Classification Search
CPC .... F16B 5/0008; F16B 5/0024; F16B 5/0056; F16B 5/0088; F16B 12/24; F16B 12/26; F16B 12/36; F16B 12/38; Y10S 403/10; Y10S 403/11; A47B 2230/0029; A47B 2230/0037; A47B 2230/0051
See application file for complete search history.

(56) References Cited

U.S. PATENT DOCUMENTS

| | | | | |
|---|---|---|---|---|
| 3,574,367 A | * | 4/1971 | Jankowski | B62D 33/044 403/201 |
| 5,062,619 A | | 11/1991 | Sato | |
| 5,122,052 A | * | 6/1992 | Trame | F16F 1/025 249/176 |

(Continued)

FOREIGN PATENT DOCUMENTS

| | | |
|---|---|---|
| CA | 3098285 A | 10/2019 |
| CH | 365507 A * | 11/1962 |

(Continued)

OTHER PUBLICATIONS

International Preliminary Report on Patentability received for PCT Patent Application No. PCT/SE2022/050326, mailed on Dec. 21, 2023, 9 pages.

(Continued)

*Primary Examiner* — Amber R Anderson
*Assistant Examiner* — Zachary A Hall
(74) *Attorney, Agent, or Firm* — Boone IP Law

(57) ABSTRACT

A mechanical connection arrangement for panels comprises a first panel and a second panel. A surface of the first panel and a surface of the second panel are parallel and in contact in a locked position of the first and second panels. The connection arrangement includes at least one rod-shaped element at the surface of the first panel and at least one corresponding insertion recess at the surface of the second panel. The connection arrangement includes locking device which comprises locking pin at one end and a spring at another end. An envelope surface of a cone shaped end part (Continued)

of the locking pin comprises a pin locking surface which in the connected state is configured to cooperate with a recess locking surface of a panel recess.

23 Claims, 10 Drawing Sheets

(56) References Cited

U.S. PATENT DOCUMENTS

| | | | | |
|---|---|---|---|---|
| 6,375,171 | B1* | 4/2002 | Zimmermann | F16F 15/067 267/179 |
| 6,506,081 | B2* | 1/2003 | Blanchfield | H01R 13/6315 439/856 |
| 6,554,526 | B1* | 4/2003 | Egelandsdal | F16B 29/00 403/294 |
| 6,953,300 | B2* | 10/2005 | Chen | F16B 21/082 403/294 |
| 9,375,085 | B2* | 6/2016 | Derelöv | A47B 88/43 |
| 10,968,936 | B2* | 4/2021 | Boo | A47B 96/201 |
| 11,445,819 | B2* | 9/2022 | Derelöv | F16B 12/20 |
| 2011/0121560 | A1* | 5/2011 | Readman | F16L 41/08 285/82 |
| 2020/0069049 | A1* | 3/2020 | Derelöv | F16B 12/20 |
| 2020/0340513 | A1* | 10/2020 | Derelöv | A47B 47/042 |

FOREIGN PATENT DOCUMENTS

| | | | |
|---|---|---|---|
| DE | 2143798 A1 | 3/1973 | |
| DE | 29702990 U1 * | 7/1997 | F16B 12/24 |
| DE | 102013104661 A1 | 11/2014 | |
| GB | 0245332 A | 1/1926 | |
| GB | 2494462 A | 3/2013 | |
| GB | 2552970 A * | 2/2018 | A47B 96/066 |
| IT | 202000900844279 | 11/2001 | |
| WO | WO-9922150 A1 * | 5/1999 | A47B 43/00 |
| WO | 2020046193 A1 | 3/2020 | |
| WO | 2020216852 A1 | 10/2020 | |

OTHER PUBLICATIONS

International Search Report and Written Opinion received for PCT Patent Application No. PCT/SE2022/050326, mailed on May 25, 2022, 11 pages.
Office Action received for Swedish Patent Application No. 2150752, mailed on Dec. 27, 2021, 8 pages.
U.S. Appl. No. 16/553,350, filed Aug. 28, 2019, Peter Derelöv.
U.S. Appl. No. 16/856,765, filed Apr. 23, 2020, Peter Derelöv.
U.S. Appl. No. 17/173,823, filed Feb. 11, 2021, Peter Derelöv.
U.S. Appl. No. 17/185,428, filed Feb. 25, 2021, Johan Svensson.
U.S. Appl. No. 17/185,403, filed Feb. 25, 2021, Johan Svensson.
U.S. Appl. No. 17/370,521, filed Jul. 8, 2021, Christian Boo.
U.S. Appl. No. 17/588,733, filed Jan. 31, 2022, Peter Derelöv.
U.S. Appl. No. 17/674,262, filed Feb. 17, 2022, Johan Svensson.
U.S. Appl. No. 17/710,055, filed Mar. 31, 2022, Johan Svensson.
U.S. Appl. No. 17/883,203, filed Aug. 8, 2022, Christian Boo.
U.S. Appl. No. 17/886,517, filed Aug. 12, 2022, Peter Derelöv.
U.S. Appl. No. 18/191,444, filed Mar. 28, 2023, Johan Svensson.
U.S. Appl. No. 18/312,808, filed May 5, 2023, Johan Svensson.
U.S. Appl. No. 18/383,242, filed Oct. 24, 2023, Peter Derelöv.
U.S. Appl. No. 18/729,224, filed Jul. 16, 2024, Johan Svensson.
U.S. Appl. No. 18/764,217, filed Jul. 4, 2024, Thomas Meijer.
U.S. Appl. No. 18/983,417, Thomas Meijer, filed Dec. 17, 2024.
Supplementary European Search Report issued by the European Patent Office in Application No. 22820653.8 dated Mar. 12, 2025 (8 pages).
Supplementary European Search Report issued by the European Patent Office in Application No. 22820654.6 dated Mar. 19, 2025 (9 pages).
U.S. Appl. No. 19/093,758, Peter Derelöv, filed Mar. 28, 2025.

* cited by examiner

FIG 15A  FIG 15B

MECHANICAL CONNECTION ARRANGEMENT FOR PANELS

CROSS REFERENCE TO RELATED APPLICATIONS

The present application claims the benefit of Swedish Application No. 2150752-0, filed on Jun. 11, 2021. The entire contents of Swedish Application No. 2150752-0 are hereby incorporated herein by reference in their entirety.

TECHNICAL FIELD

Embodiments of the present invention concern a mechanical connection arrangement for panels comprising a first panel, a second panel wherein a surface of the first panel and a surface of the second panel are parallel and in contact in a locked position of the first and second panels. The connection arrangement comprises at least one rod-shaped element at the surface of the first panel and at least one corresponding insertion recess at the surface of the second panel. The rod-shaped element is configured to be inserted in the insertion recess, wherein the rod-shaped element extends at a first angle from the surface of the first panel and the insertion recess extends into the second panel at a second angle from the surface of the second panel. Both the first and second angles are in the range of 30° to 60° and more preferably 40° to 50° wherein the connection arrangement comprises a spring loaded locking device having a spring at one end and a locking pin at the other end. The locking device is arranged in a first panel recess in one of the panels in a range from 85 to 95 relative the contact surface between the two panels and arranged with the locking pin to fit in a second panel recess in the other panel when the arrangement is in a connected state.

BACKGROUND

Assembling two or more objects into one piece, for instance furniture, has historically required tools such as drills, screwdrivers, hammers, and wrenches.

Starting with click floors, assembling not requiring tools has further been developed and more or less all types of furniture in a household could be assembled without tools or at least with a minimum of tools.

WO 2020/046193 discloses a set including a first panel, a second panel and a mechanical locking device for locking the first panel to the second panel. The first panel includes a first edge surface, and the second panel includes a second panel surfaced. The mechanical locking device includes at least one rod-shaped element that extends at a first angle from the first edge surface. An insertion groove extends into the second panel surface at a second angle from the second panel surface. The mechanical locking device further includes at least one locking groove and at least one locking part. The locking groove includes at least one locking surface extending at a third angled from the first edge surface or from the second panel surface. The locking part is configured to be inserted into the locking groove and lock against the locking surface. The third angle is different than the first angle.

WO 2020/046194 discloses a set including a first panel, a second panel and a mechanical locking device for locking the first panel to the second panel. The first panel includes a first edge surface, and the second panel includes a second panel surface. The mechanical locking device includes at least one rod-shaped element at the first edge surface and at least one insertion groove at the second panel surface. The rod-shaped element is configured to be inserted into the insertion groove. Said set is also comprising a back panel configured to be inserted in and to cooperate with at least one of the first and second panel grooves and at least one locking gear configured to cooperate with the back panel and the first and/or second panel groove, for locking of the first panel to the second panel.

SUMMARY

Accordingly, embodiments of the present disclosure preferably seek to further provide alternative mounting solutions that require a minimum of tools and that facilitates having a tight fit between two panels by providing a mechanical connection arrangement according to the appended patent claims.

According to a first aspect of the present disclosure, a mechanical connection arrangement for panels comprises a first panel and a second panel wherein a surface of the first panel and a surface of the second panel are parallel and in contact in a locked position of the first and second panels. The connection arrangement comprises at least one rod-shaped element at the surface of the first panel and at least one corresponding insertion recess at the surface of the second panel. The rod-shaped element is configured to be inserted in the insertion recess. The rod-shaped element extends at a first angle from the surface of the first panel and the insertion recess extends into the second panel at a second angle from the surface of the second panel. Both the first and second angles are in the range of about 30° to about 60° such as about 40° to about 50°. The connection arrangement comprises a locking device which comprises locking pin at one end and a spring at another end, wherein the spring is configured to cooperate with a first panel recess in one of the panels and the locking pin is configured to cooperated with a second panel recess in the other panel when the arrangement is in a connected state. An end part of the locking pin is cone shaped, such as shaped as truncated cone which comprises a top-surface which is an end surface of the locking pin. An envelope surface of the cone shaped end part comprises a pin locking surface which in the connected state is configured to cooperate with a recess locking surface of the second panel recess.

According to a further aspect of the present disclosure a longitudinal centre axis of the locking pin is at an angle relative the contact surface between the two panels, wherein the angle is in a range from about 85° to about 95°.

According to a further aspect of the present disclosure difference between the first angle and the second angle is between 0.5° and 3°. This provides for a tighter fit of the panels than should there be no difference in the angles.

According to yet a further aspect of the present disclosure the slant angle of the truncated cone is between about 3° and about 20° such as between 5° and 15°.

According to another aspect of the present disclosure the truncated cone is a right cone.

The slant height of the truncated cone is according to an aspect of the present disclosure at least 40% of the top surface diameter.

According to a further aspect of the present disclosure a lateral surface of the locking pin comprises a radially extending recess having an inner sloping surface axially towards the end part of the locking pin and starting at an axial point at a side of the recess opening closest to the end with the spring. The recess may provide the possibility to unlock the connection arrangement by inserting a tool in the recess.

According to a further aspect of the present disclosure the recess in the locking pin is a through hole such that there is a recess opening and a recess exit. This allows for the tool to pass through the locking pin.

According to another aspect of the present disclosure a width of the recess of the locking pin is between 30% and 70% of a diameter of the locking pin, such as between 40% and 60% of the diameter of the locking pin.

According to yet another aspect of the present disclosure the height of the recess opening in the locking pin in the axial direction is between 1.6 to 2.5, such as about 2, times as large as the recess exit on the opposite side of the locking pin.

The panel with the first panel recess has according to an aspect of the present disclosure a service recess in a direction perpendicular to the first panel recess and arranged such that the two recesses connect at a distance below the contact surface of the panel. The service recess allows for the tool to be inserted in the panel and further into the recess in the locking pin.

According to further aspect of the present disclosure the service recess extends beyond the first panel recess such that the two recesses crosses. This allows for the tool to be inserted and to keep the locking device in a compressed state.

In accordance with an aspect of the present disclosure the second panel recess comprises a beveled opening edge at least along a part of its circumference. The beveled edge may facilitate the fitting of the locking pin into the recess.

According to a further aspect of the present disclosure the panel recess has a conical shape corresponding to the cone shape of the locking pin. Thus, the locking surface area between the locking pin and the panel recess is increased in the locked position.

In accordance with a further aspect of the present disclosure the recesses in the panels are machine processed.

According to yet another aspect of the present disclosure longitudinal entre axis of the locking pin is perpendicular to the contact surface between the panels.

According to yet a further aspect of the present disclosure the locking device comprises two opposed radially projecting parts at an end of the spring farthest away from the locking pin. This may stop to some extent the locking device from turning in its recess in the panel.

According to yet another aspect of the present disclosure the locking device comprises a polymer material, such as a thermoplastic material, optionally with an enforcement, such as glass fibre.

According to yet another aspect of the present disclosure the spring and the locking pin may be injection moulded in one piece.

According to yet another aspect of the present disclosure the panels are wood based panels such as HDF, MDF or plywood panels.

According to a second aspect of the present disclosure a mechanical connection arrangement for panels comprises a first panel, a second panel wherein a surface of the first panel and a surface of the second panel are parallel and in contact in a locked position of the first and second panels. The connection arrangement comprises at least one rod-shaped element at the surface of the first panel and at least one corresponding insertion recess at the surface of the second panel, wherein the rod-shaped element is configured to be inserted in the insertion recess. The rod-shaped element extends at a first angle from the surface of the first panel and the insertion recess extends into the second panel at a second angle from the surface of the second panel, wherein both the first and second angles are in the range of about 30° to about 60°, such as about 40° to about 50°. The connection arrangement comprises a locking device which comprises a locking pin at one end and a spring at another end, wherein the spring is configured to cooperate with a first panel recess in one of the panels and the locking pin is configured to cooperated with a second panel recess in the other panel when the arrangement is in a connected state. An end part of the locking pin comprises a pin locking surface which in the connected state is configured to cooperate with a recess locking surface of the second panel recess. A lateral surface of the locking pin comprises a radially extending recess. The recess has an inner sloping surface axially towards the end part of the locking pin which starts at an axial point at a side of a recess opening closest to the end with the spring.

According to a further aspect of the present disclosure the end part of the locking pin comprises an envelope surface which comprises the pin locking surface.

According to a further aspect of the present disclosure the recess of the locking pin is a through hole such that there is a recess opening and a recess exit.

According to a further aspect of the present disclosure a width of the recess of the locking pin is between 30% and 70% of a diameter of the locking pin and more preferably between 40% and 60% of the diameter of the locking pin.

According to a further aspect of the present disclosure a height of the recess opening, in the axial direction, is between 1.6 to 2.5, such as about 2, times as large as a height of the recess exit on the opposite side of the locking pin.

According to a further aspect of the present disclosure the panel with the first panel recess has a service recess in a direction perpendicular to the first panel recess and arranged such that the two recesses connect at a distance below the contact surface of the panel.

According to a further aspect of the present disclosure the service recess extends beyond the first panel recess such that the two recesses crosses.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings.

FIG. 15A-D are side views of alternative embodiments of a part of the arrangement.

DETAILED DESCRIPTION OF EXEMPLARY EMBODIMENTS

Figure 1:
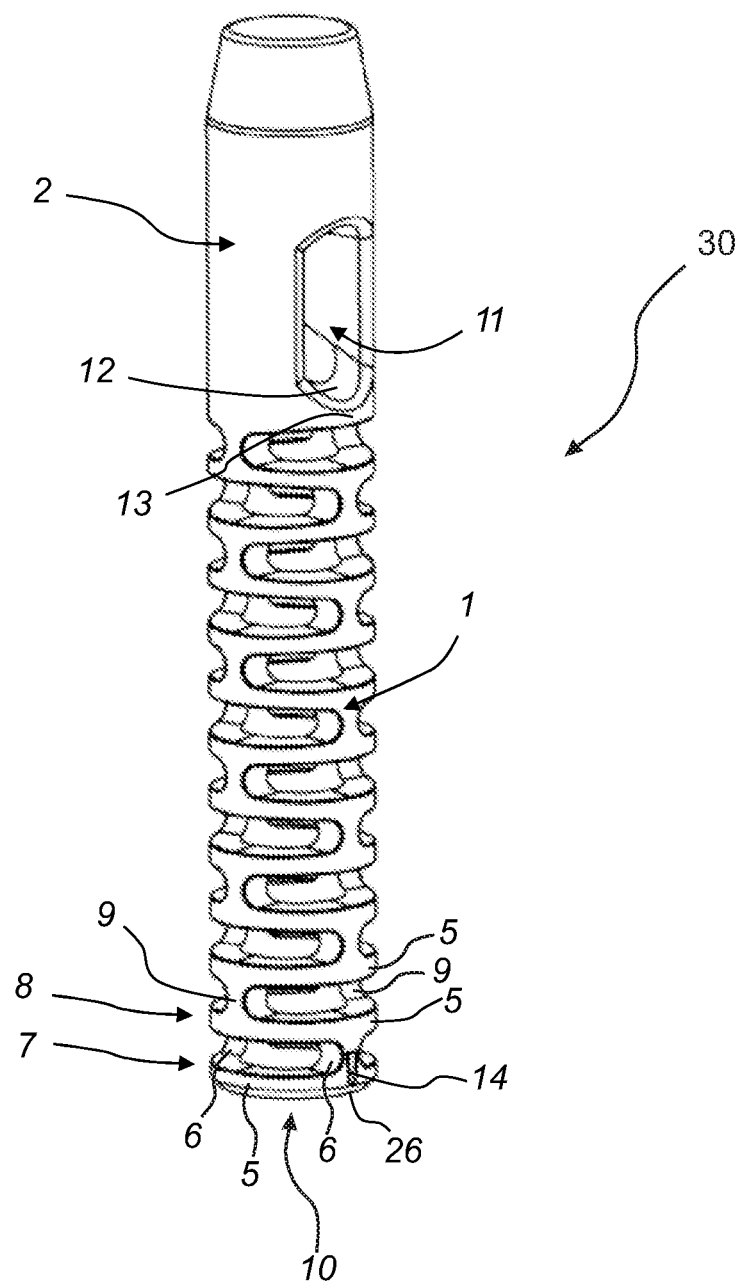
FIG. 1 is a perspective view of a locking device of an embodiment.

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

FIGS. 4-9 show the process of connecting two panels to one another. Thus, there is a first panel 15, a second panel 16 wherein a surface 17 of the first panel 15 and a surface 18 of the second panel 16 are parallel and in contact in a locked position of the first and second panels 15, 16. The connection arrangement comprises at least one rod-shaped element 19 at the surface 17 of the first panel 15 and at least one corresponding insertion recess 20 at the surface 18 of the second panel 16.

The first panel 15 and/or the second panel 16 may be a wood based panel.

The wood based panel may be an HDF, a MDF or a plywood panel.

A furniture component, formed from panels 15, 16, may be a part of a furniture product, such as a bookshelf, a cupboard, a wardrobe, a box, a drawer, a kitchen cabinet, a countertop, or a tabletop.

The process of connecting first panel 15 to the second panel 16 includes a displacement of the first panel relative the second panel in a direction 50 which parallel to a longitudinal centre axis of the rod-shaped element 19 and a compression of a spring, including any spring-like material or arrangement.

The rod-shaped element 19 is configured to be inserted in the insertion recess 20. The rod-shaped element 19 extends at a first angle from the surface 17 of the first panel 15 and the insertion recess 20 extends into the second panel 16 at a second angle from the surface 18 of the second panel 16. Both the first and second angles may be 30-60 degrees, such as 35-55 degrees, such as about 45°. The connection arrangement includes a locking device which comprises a spring 1 at one end and a locking pin 2 at another end.

The locking pin 2 is at least partly arranged in a first panel recess 21 in one of the panels 15, 16 at an angle relative the contact surface between the two panels 15, 16 which may be in a range from about 85° to about 95° and arranged with an end part of the locking pin 2 to fit in a second panel recess 22 in the other panel 15, 16 when the arrangement is in a connected state.

The first panel recess 21 may be a cylindrical hole, such as a drill hole. The second panel recess 22 may be a cylindrical hole, such as a drill hole.

The end part of the locking pin 2 may be cone shaped, such as shaped as truncated cone which comprises a top-surface which is an end surface of the locking pin.

Figure 5:
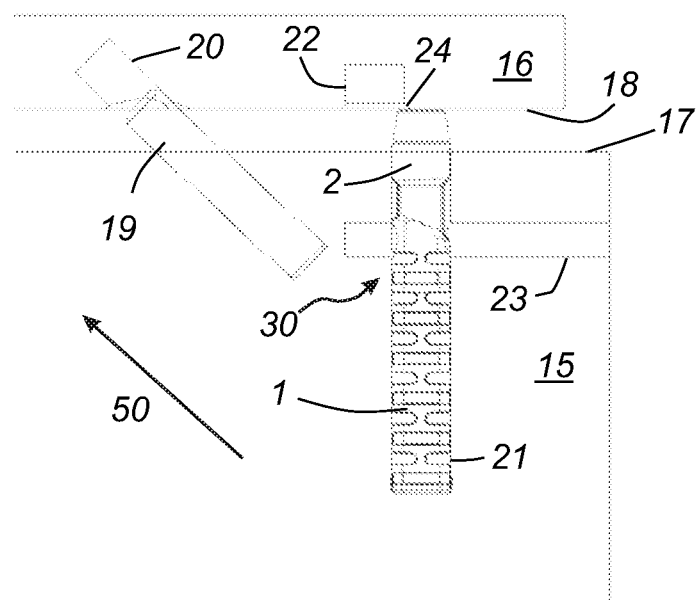

In one embodiment of the connecting arrangement the panels 15, 16 are brought closer together such that the rod-shaped element and the corresponding recess in the other panel are aligned. At one point, as shown in FIG. 5, the second panel 16 is in contact with a top of the locking pin 2.

Figure 6:
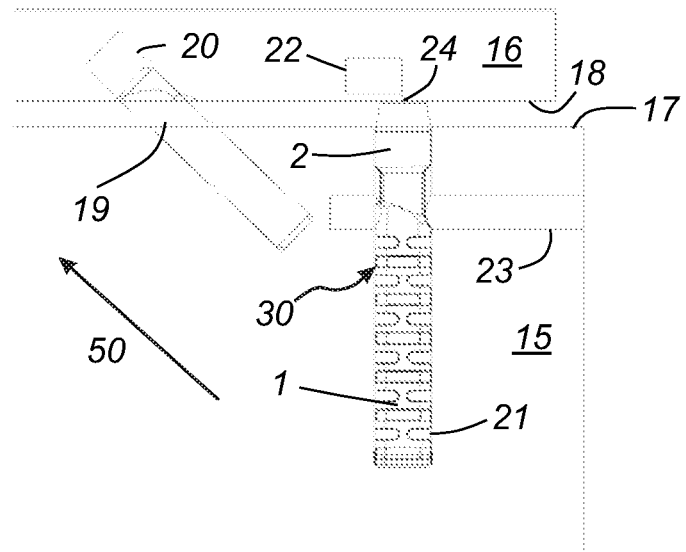
Figure 7:
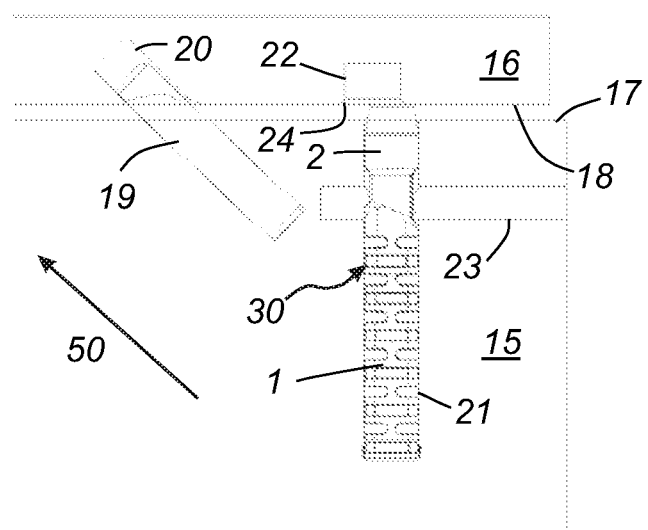
Figure 8:
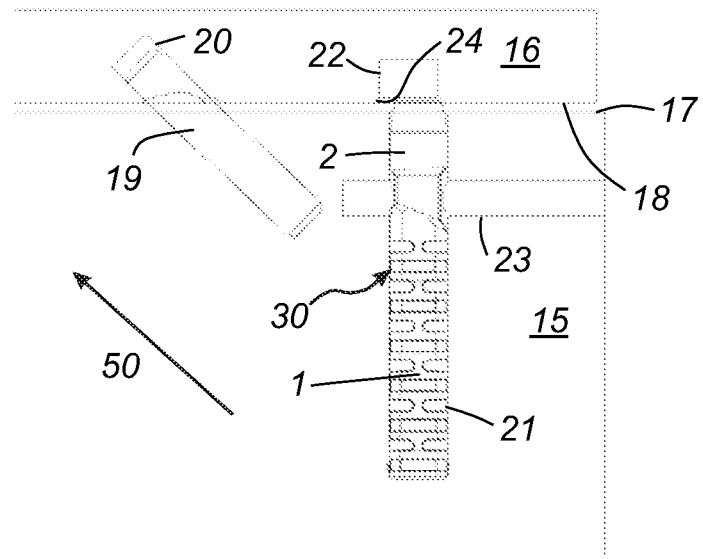

As shown in FIG. 6 the panels 15, 16 are closer and the spring 1 is slightly compressed and in FIG. 7 and FIG. 8 the end 2 of the locking pin is coming closer to be aligned with the second panel recess 22.

Figure 9:
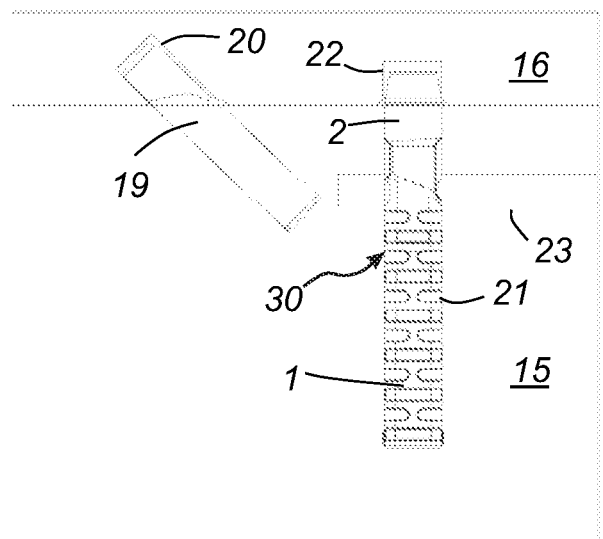

Finally in FIG. 9, the locking pin 2 has snapped into the second panel recess 22 and the two panels 15, 16 are connected to one another.

Figure 10A:
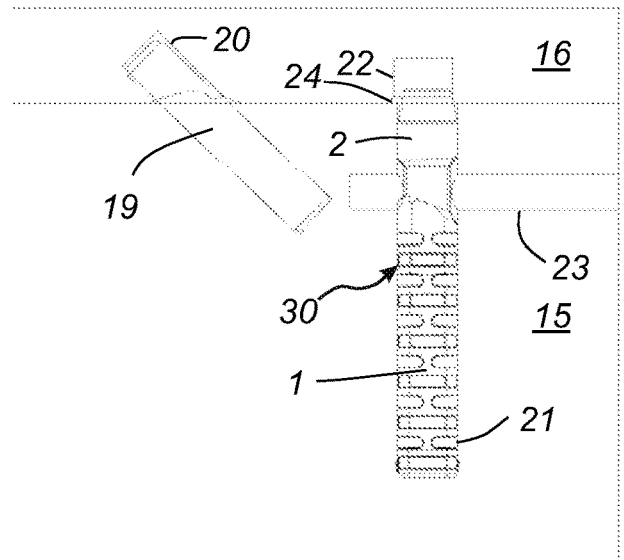
FIG. 10A is a side view of a connection arrangement according to an embodiment.

In FIG. 10A, an advantage of the cone shaped end part of the locking pin 2 is shown, i.e., as can be seen the locking pin 2 and the second panel recess 22 is not completely aligned. Even though, due to the cone-shaped end part of the locking pin 2, the two panels 15, 16 are locked to one another. To further facilitate the connection, the second panel recess 22 may comprise a bevel 24 at an edge of an opening. The bevel 24 may extend along a circumference of the recess.

Figure 10B:
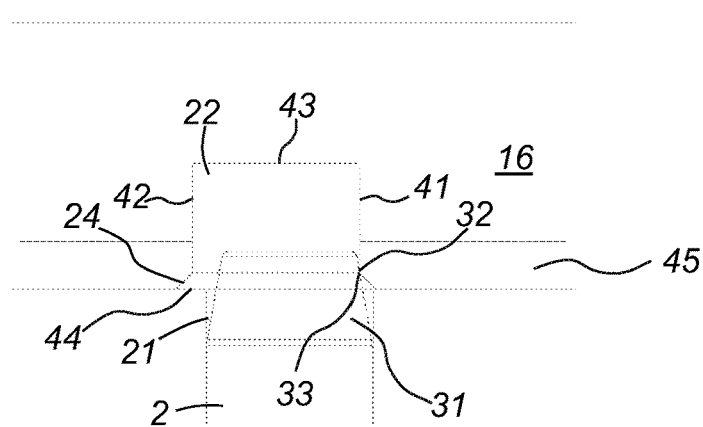
FIG. 10B is an enlargement of a part of FIG. 10A.
Figure 11:
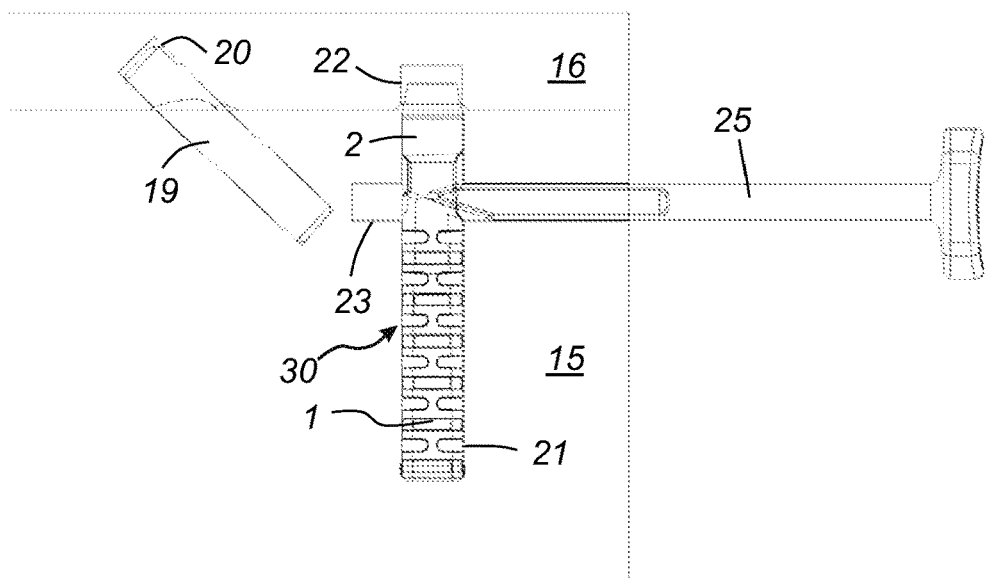
FIG. 11 to FIG. 14 show in sequence the unlocking of a connection arrangement.

FIG. 10B is an enlargement of a part of FIG. 10A and shows that an envelope surface 31 of the cone shaped end part of the locking pin comprises a pin locking surface 33 which in the connected state is configured to cooperate with a recess locking surface 32 of the second panel recess 22.

The second panel recess 22 may comprise a first side 41 and an opposite second side 42 and a bottom surface 43 which extends between the first side 41 and the opposite second side 42. The first side may comprise the recess locking surface 32.

The second panel 16 may comprise a layer 45 of higher density material at the surface 18. The recess locking surface 32 may be within the layer 45 which may increase the locking strength of the locking device.

The difference between the first angle and the second angle is between 0.5° and 5°, such as between 1 and 4, preferably about 3°.

The slant angle of the truncated cone may be 5 to 15 degrees, such as 8-12 degrees, such as about 10° in the shown embodiment and the truncated cone may be a right cone. The longitudinal centre axis of the locking pin is perpendicular to the contact surface between the panels 15, 16.

The slant height 65 of the truncated cone may be at least 40% of the top surface diameter 66, such as 40% to 200%, such as 40% to 100%.

The truncated cone may be symmetric.

Figure 2:
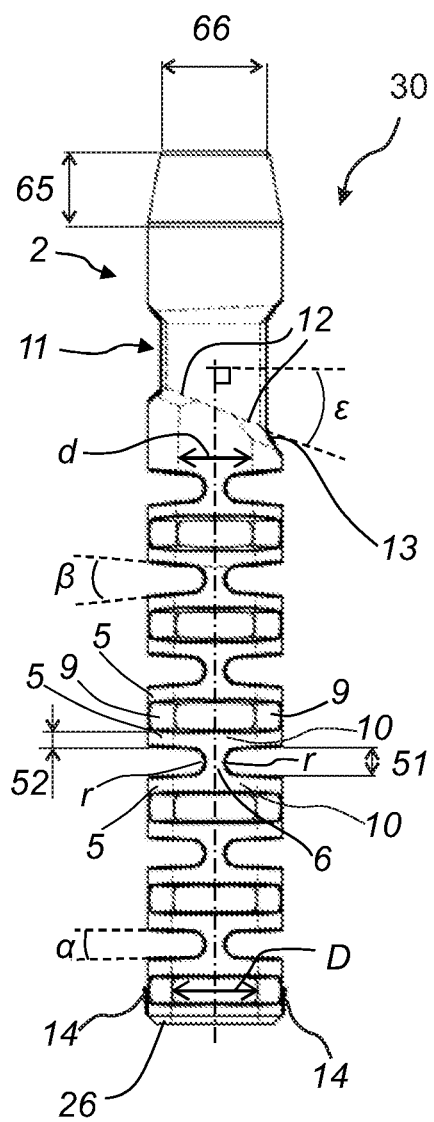
FIG. 2 is a side view of the locking device of FIG. 1.
Figure 3:
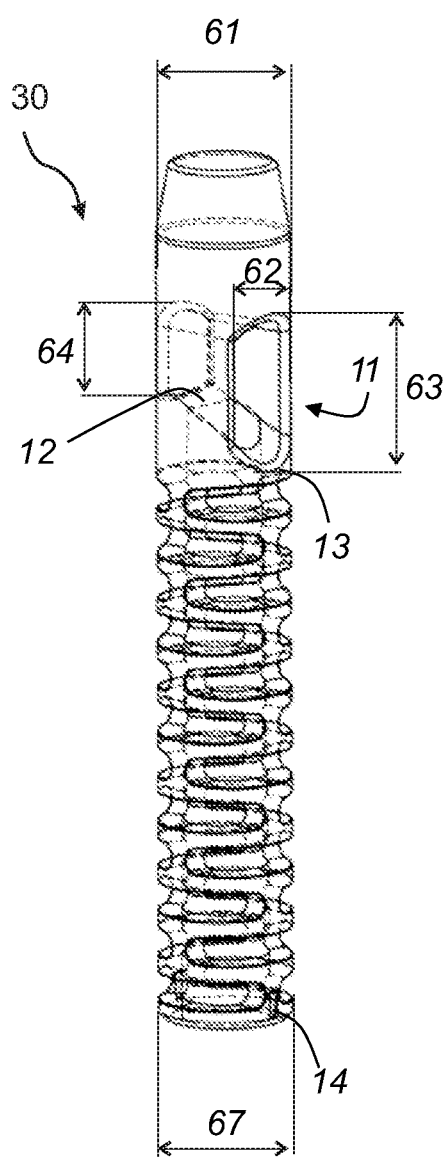
FIG. 3 is a cross sectional perspective view of the locking device of FIG. 1 and FIG. 2.
Figure 4:
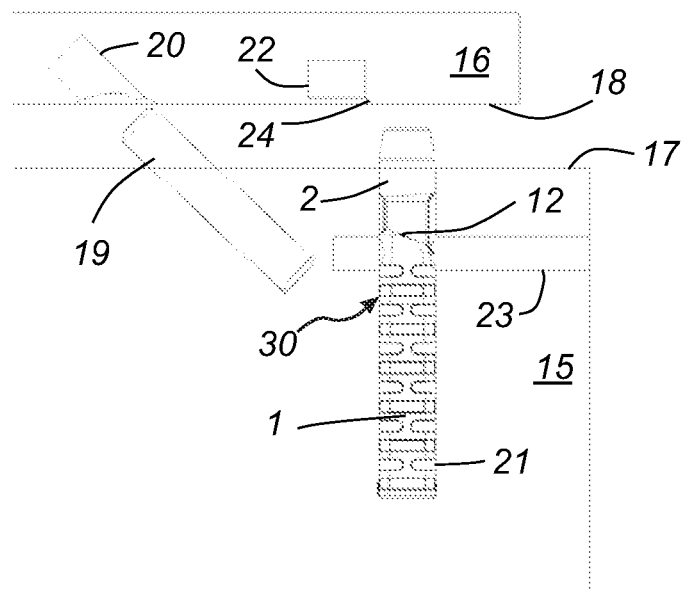
FIG. 4 to FIG. 9 show in sequence the attaching of one panel to another panel with the locking device.

The lateral surface of the locking pin has a radially extending recess 11, the recess having an inner sloping surface 12 axially towards the locking pin 2 and starting at an axial point 13 at the side of the recess opening closest to the end of the locking device with the spring 1, see FIGS. 1-3.

The recess 11 in the locking pin may be a through hole such that there is a recess opening and a recess exit.

A width 62 of the recess 11 of the locking pin 2 may be between 30% and 70% of a diameter 61 of the locking pin 2, such as between 40% and 60% of the diameter 61 of the locking pin 2.

A height 63 of the recess opening, in the axial direction, may be from 1.6 to 2.5, such as about 2, times as large as a height 64 of the recess exit on the opposite side of the locking pin 2.

The panel 15 with the first panel recess 21 has a service recess 23 in a direction perpendicular to the first panel recess 21 and arranged such that the two recesses 21, 23 connect at a distance below the contact surface of the panel 15. The service recess 23 further extends beyond the first panel recess 21 such that the two recesses 21, 23 crosses.

Figure 12:
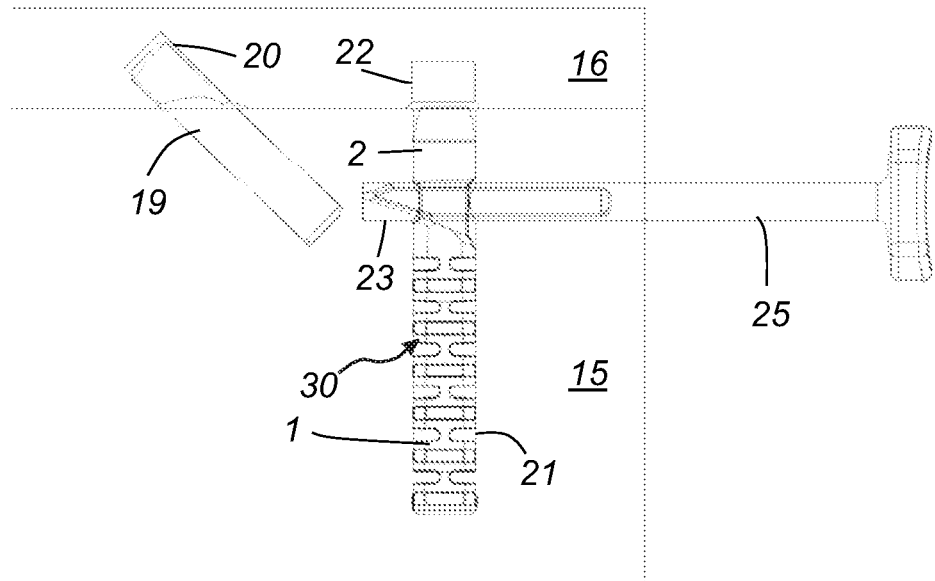
Figure 13:
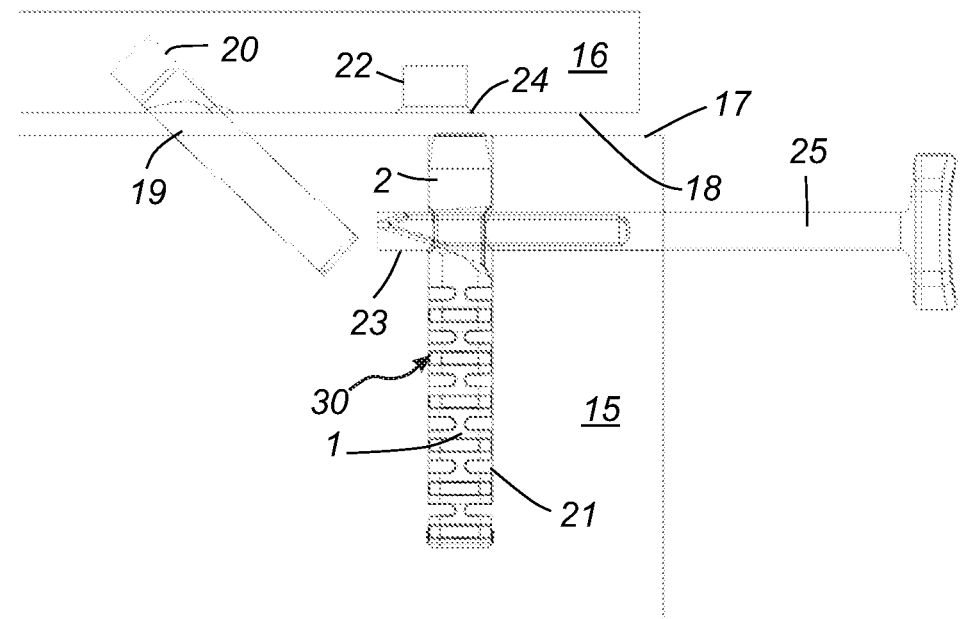
Figure 14:
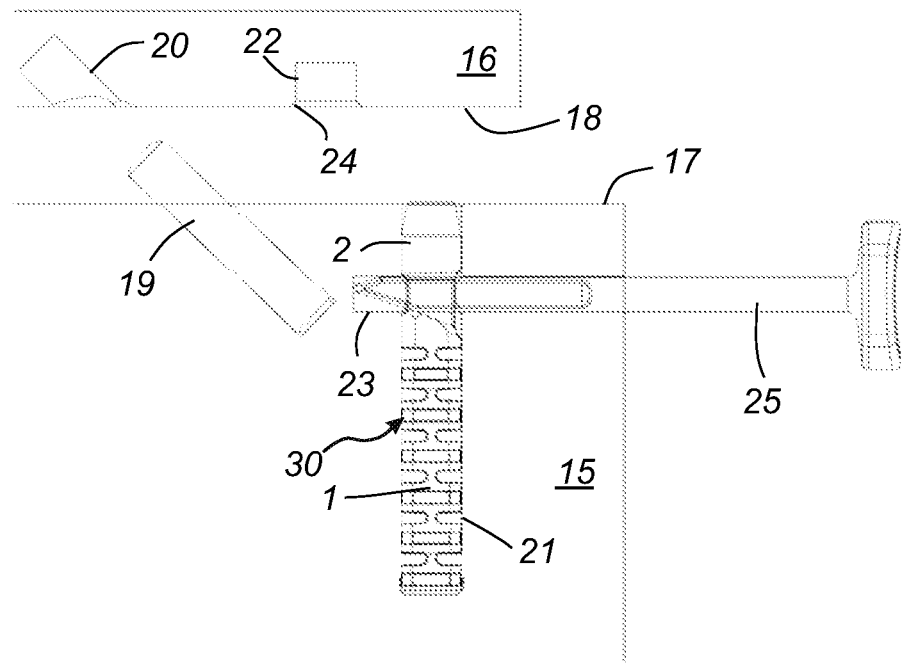
Figure 14:
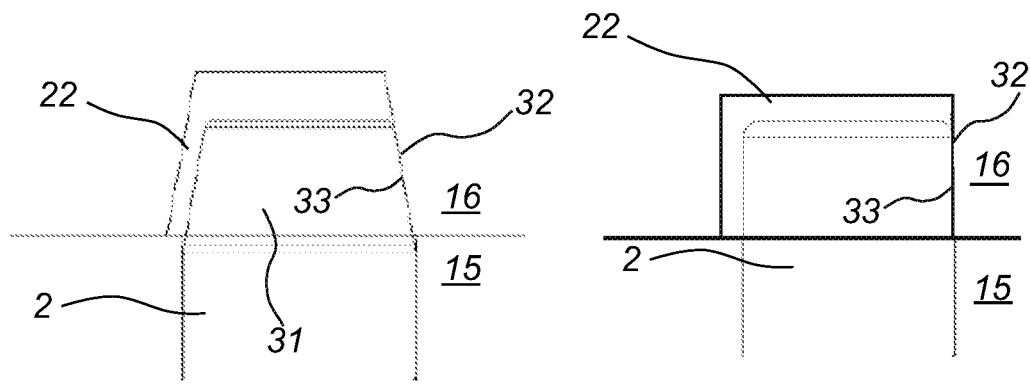

In FIG. 11 to FIG. 14, the unlocking or disassembling of the connection arrangement is shown. A tool 25 is inserted in the service recess 23. The tool may have a similar angle on its tip to the angle ϵ on the sloping surface 12 of the recess through the locking pin 2. The further the tool 25 is pushed into the service recess 23, the more the spring is compressed until the tool 25 is pushed entirely through the recess as shown in FIG. 12 to FIG. 14 when the panels 15, 16 can be pulled apart. Since the service recess 23 passes the panel recess 21, the tool 25 does not need to be held, i.e., the tool 25 stays in this position.

FIG. 15A shows an alternative embodiment of the second panel recess 22 which comprises a conical shape corresponding to the truncated cone shape of the locking pin 2. Thus, the contact locking surfaces 32, 33 are increased when the panels 15, 16 are locked to one another.

FIG. 15B shows an alternative embodiment of the locking pin 2 which comprises a cylindrical shaped end part and an alternative embodiment of the second panel recess 22 which comprises a cylindrical shape corresponding to the cylindrical shaped end part. Thus, the contact locking surfaces 32, 33 are increased when the panels 15, 16 are locked to one another.

Figure 15C:
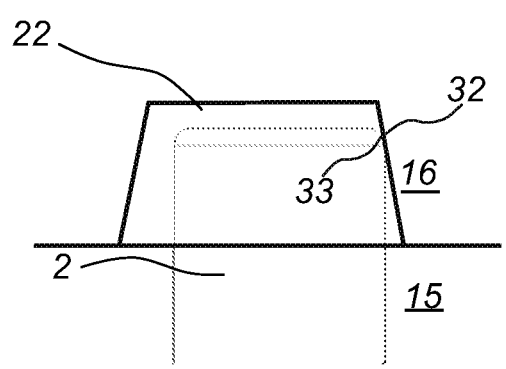

FIG. 15C shows an alternative embodiment of the locking pin 2 and an embodiment of the second panel recess 22 which comprises a conical shape. This combination may have effect that the panels 15, 16 are locked to one another even if the first panel recess and the second panel recess are not perfectly aligned.

Figure 15D:
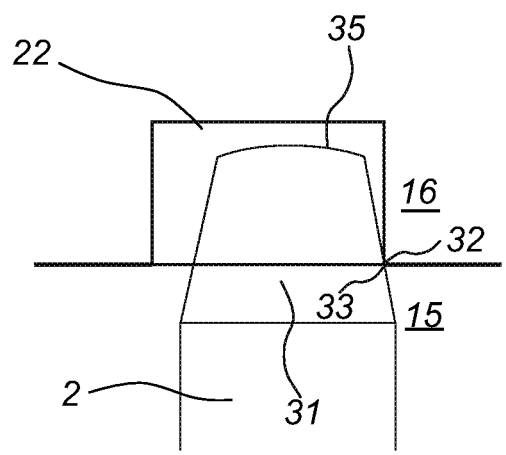

FIG. 15D shows an alternative embodiment of the locking pin 2 which comprises a top surface 35. The top surface 35 has a rounded shape which may facilitate the process of connecting the panels 15, 16 to one another. The rounded top surface 35 may have the effect of less friction when the top surface is displaced along and relative the surface of the second panel. The rounded top surface 35 may facilitate snapping in of the locking pin 2 into the second panel recess 22. The rounded stop surface may be combined with any of the other disclosed embodiments herein.

Figure 16:
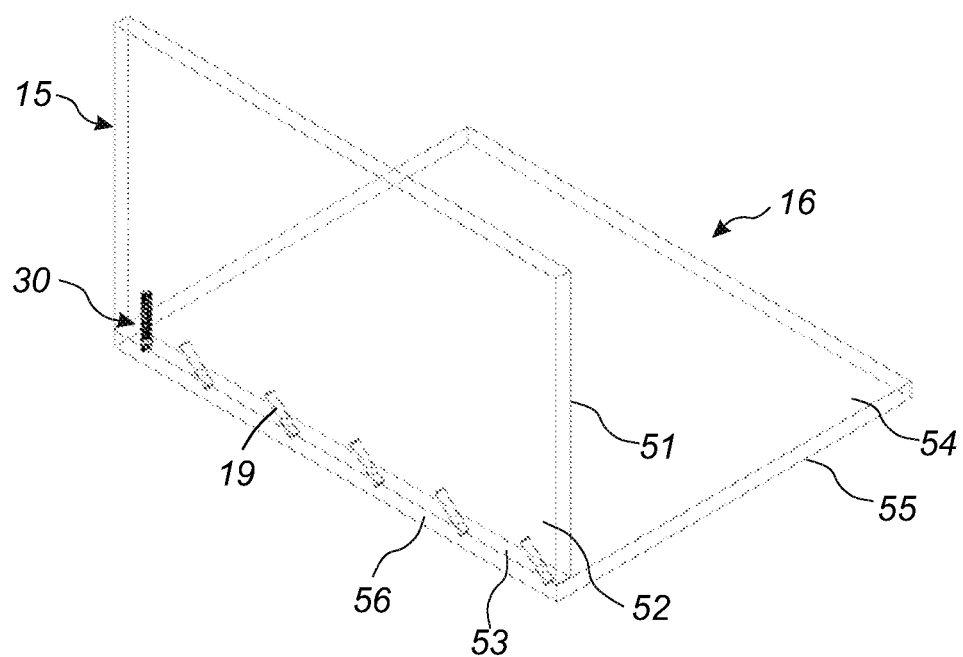
FIG. 16 is a perspective view of two panels joined with a connection arrangement.

For context purpose, FIG. 16 shows and example of two panels 15, 16 connected using the above mentioned connection arrangement.

The first panel 15 may comprise a main surface 51, a parallel and opposite main surface 52 and an edge surface 53 extending between the main surface 51 and the opposite main surface 52.

The second panel 16 may comprise a main surface 54, a parallel and opposite main surface 55 and an edge surface 56 extending between the main surface 54 and the opposite main surface 55.

The main surface 51 of the first panel 15 and the main surface 54 of the second panel 16 may be perpendicular to each other in the locked position of the first panel 15 and the second panel 16.

The edge surface 53 of the first panel 15 and a main surface 54 of the second panel 16 may be parallel and in contact in the locked position of the first and second panels 15, 16.

The edge surface 56 of the second panel 16 may be parallel in the locked position with the main surface 51 of the first panel 51.

Figure 17:
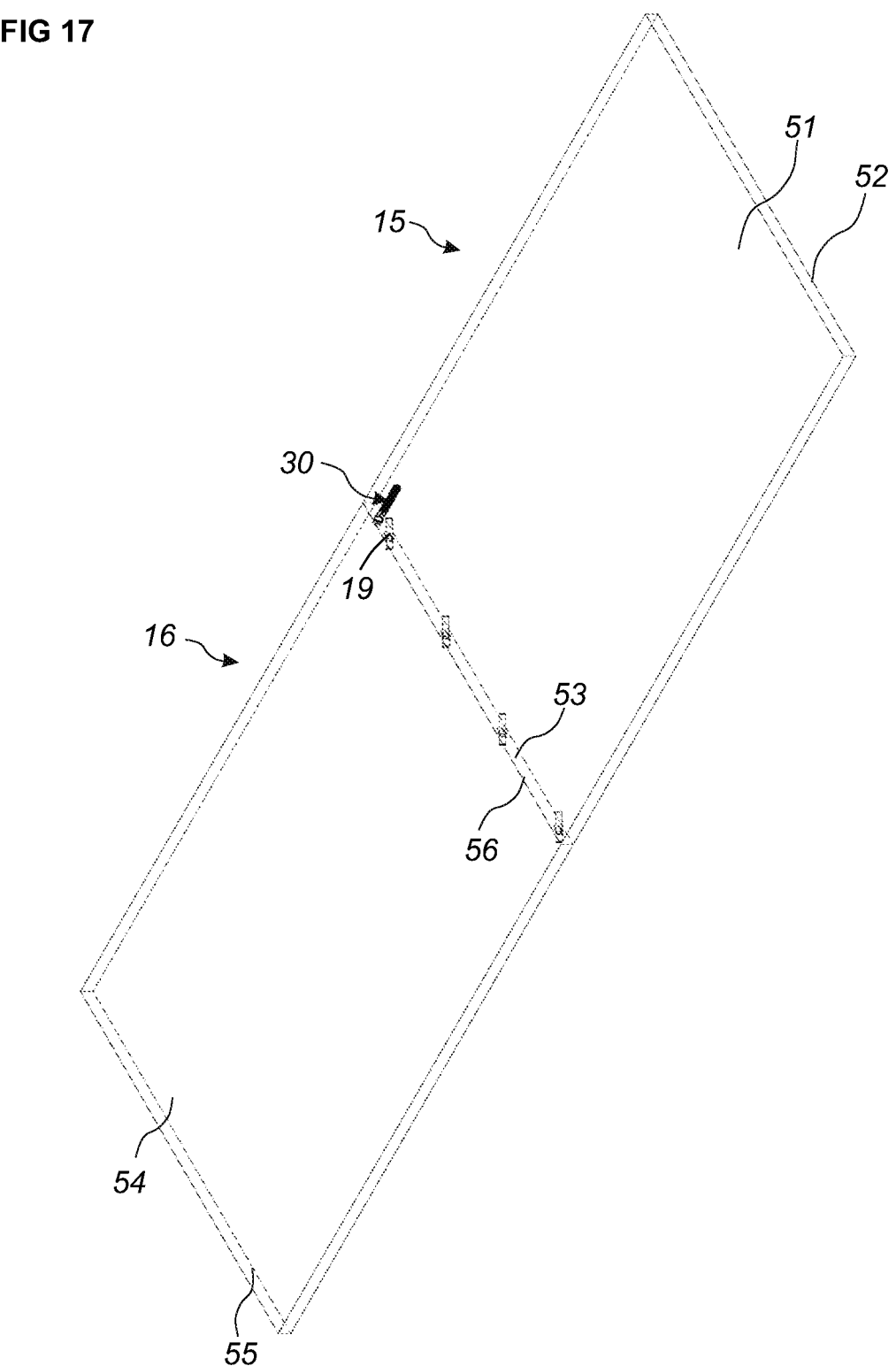
FIG. 17 shows an example of two panels connected with a connection arrangement.

For context purpose, FIG. 17 shows an example of two panels 15, 16 connected using the above mentioned connection arrangement.

The first panel 15 may comprise a main surface 51, a parallel and opposite main surface 52 and an edge surface 53 extending between the main surface 51 and the opposite main surface 52.

The second panel 16 may comprise a main surface 54, a parallel and opposite main surface 55 and an edge surface 56 extending between the main surface 54 and the opposite main surface 55.

The main surface 51 of the first panel 15 and the main surface 54 of the second panel 16 may be parallel to each other in the locked position of the first panel 15 and the second panel 16.

The edge surface 53 of the first panel 15 and the edge surface 56 of the second panel 16 may be parallel and in contact in the locked position of the first and second panels 15, 16.

The example in FIG. 17 may two panels locked to each other to obtain a countertop or a tabletop.

The recesses 20, 21, 22, 23 in the panels 15, 16 may be machine processed.

Further, as best shown in FIGS. 1-3, the locking device 30 comprises two opposed radially projecting parts 14 at an end part of the spring farthest away from the locking pin 2 which may minimize the risk of the locking device 30 turning such that a tool 25 cannot be inserted in the panel recess 11.

Regarding the spring 1, below is a more detailed description of an embodiment of the spring. However, any type of spring could be used for the connection arrangement.

FIG. 1 shows a locking device 30 which includes a spring 1 and a locking pin 2. The locking device 30 may be configured for locking two components to one another. As can be seen in the figure, the spring 1 is a sequence of a first and a second elements 7, 8, wherein each element includes a disc-shaped part 5 and two struts 6 (or two struts 9). The two, relative the centre of the disc-shaped part 5, opposed bridging struts 6, 9 are arranged equally distanced from the centre and on the same side of the disc-shaped part 5. Further, the elements 7, 8 with the struts 6, 9 are arranged with the disc-shaped parts 5 parallel to one another. The first element 7 with the struts 6 directed towards the second element 8 is connected with the struts 6 to the second element 8 with the struts 9 of the second element 8 pointing away from the first element 7 and towards the next element. A straight line between the struts 6 of the first element 7 is perpendicular to the line between the struts 9 of the second element 8, when viewed axially.

The locking device 30 may comprise a polymer material, such as a thermoplastic material, optionally with an enforcement, such as glass fibre.

The spring 1 and the locking pin 2 may be injection moulded in one piece.

The disc-shaped parts 5 may be circular or ovular and the disc-shaped parts 5 may have centrally placed, circular openings 10. Thus, the shown spring 1 could be seen as made of a series of circular parts 5 with bridging struts 6, 9.

The circular openings 10 may form an axial hole extending through the spring.

The axial hole or recess may be slightly conical such that the diameter d close to the end of the locking pin 2 is smaller than the diameter D at the end of spring away from the locking pin end 2. For example, D may be 1.05 to 2 times the size of d, such as 1.1 to 1.5 times, such as about 1.3.

In the shown embodiment, there are 12 elements but depending on where the spring should be used, any number of elements could be considered, such as 3-20, such as 5-15.

An axial distance 51 between two adjacent disc-shaped parts 5 is larger than an axial thickness 52 of a single disc-shaped part 5.

In one example embodiment, the bridging struts 6, 9 on one disc-shaped part may be separated by the axial hole, thus the bridging struts on one disc-shaped part may be separated by a bridging struts distance which may be equal to the diameter d/D of the axial hole at the bridging struts.

The bridging struts distance in a radial direction may be between 1.5 and 4 times the axial distance 51 between two adjacent disc-shaped parts 5 and more preferably between 2 and 3 times the axial distance 51 between two adjacent disc-shaped parts 5.

As also can be seen, the disc-shaped elements 5 and the struts 6, 9 together with the locking pin 2 are made from the same material. The spring could for instance be injection moulded.

Further, the disc-shaped part 5, at an end of the spring, may have two opposed radially projecting parts 14. When the locking device is inserted in a hole/recess in a panel, the locking pin with these projecting parts 14 may exhibit a rotational resistance, due to contact between the projecting parts 14 and the hole/recess.

Turning to FIG. 2, the bridging struts 6, 9 may have a concave surface and an opposite concave surface. The concave surface and the opposite concave surface may extend between two adjacent disc-shaped parts 5. The concave surface and the opposite concave surface may have a curved surface with a radius r. The radius r may be about half the distance 51 between the adjacent disc-shaped parts 5 adjacent to the struts 6, 9.

The axial distance between the disc-shaped parts 5 may increase from one end of the spring 1 to the other end. For example, the axial distance may be greater at the end with the locking pin 2, or vice-versa.

Also, the average axial thickness of the disc-shaped parts 5 may decrease from one end of the spring 1 to the other end. This could also be seen in an increasing angle between the disc-shaped part 5 from one end of the spring to the other. For example, an angle $\alpha$ between the second and the third disc-shaped parts 5 may be close to 0°, such as 0-5 degrees. The angle may increase linearly upwards, such that an angle $\beta$ between two adjacent disc-shaped parts 5 at an end of the spring 2 close to the locking pin 2 may be greater than an angle a at the other end of the spring. The angle between each successive disc shaped parts 5 may increase.

The spring may be injection moulded and the slightly conical shape may facilitate the retrieval of a moulding pin.

The increasing angle from $\alpha$ to $\beta$ may be configured to compensate for the diameter decreasing from D to d. A smaller angle may allow for more material in the disc shaped part 5.

The axial thickness 51 of the disc-shaped parts is measured at the thinnest par. The axial thickness 51 of the disc-shaped parts 5 may decrease when the diameter of the axial hole/recess is decreased. This may have the effect that the spring constant throughout the length of the spring is essentially constant, such as not varying more than 20% throughout the length.

A lateral surface of the locking pin has a radially extending recess 11, the recess 11 having an inner sloping surface 12 axially towards the locking pin and starting at an axial point 13 at the side of the recess opening closest to the end with the spring of the locking pin. The sloping surface angle $\epsilon$ may be 15-45 degrees, such as 20-40 degrees, such as about 30°, as seen from the side of the locking pin.

In FIG. 3, it is shown more clearly that the recess 11 is a through hole such that there is a recess opening and a recess exit.

Also, the leading end of the spring 1 has a beveled edge 26 so as to facilitate the insertion of the spring 1 into a first panel recess 21 in a first panel 15.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

As used herein, the term "about" means ±10% of the noted value. By way of example only, an angle of "about 50 degrees" could include from 45 degrees up to and including 55 degrees.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The indefinite articles "a" and "an," as used herein in the specification and in the claims, unless clearly indicated to the contrary, should be understood to mean "at least one."

Further embodiments of the invention are described below:
1. A mechanical connection arrangement for panels comprising a first panel 15, a second panel 16 wherein a surface 17 of the first panel 15 and a surface 18 of the second panel 16 are parallel and in contact in a locked position of the first and second panels 15, 16, the connection arrangement comprising at least one rod-shaped element 19 at the surface 17 of the first panel 15 and at least one corresponding insertion recess 20 at the surface 18 of the second panel 16, wherein the rod-shaped element 19 is configured to be inserted in the insertion recess 20, wherein the rod-shaped element 19 extends at a first angle from the surface 17 of the first panel 15 and the insertion recess 20 extends into the second panel 16 at a second angle from the surface 18 of the second panel 16, wherein both the first and second angles are in the range of 30 to 60 degrees and more preferably 40 to 50 degrees wherein the connection arrangement comprises a spring loaded locking device 30, the spring loaded locking device 30 having a spring 1 at one end and a locking pin 2 at the other end, wherein the locking pin 2 is arranged in a first locking pin recess 21 in one of the panels 15, 16 in a range from 85 to 95 degrees relative the contact surface between the two panels 15, 16 and arranged with the locking pin 2 to fit in a second locking pin recess 22 in the other panel 15, 16 when the arrangement is in a connected state, wherein the locking pin 2 of the locking pin is a truncated cone and the end surface of the locking pin being the top-surface of the truncated cone.
2. The arrangement according to embodiment 1, wherein the difference between the first angle and the second angle is between 0.5 and 3 degrees.
3. The arrangement according to any of the preceding embodiments, wherein the slant angle of the truncated cone is between 3 and 20 degrees and more preferably between 5 and 15 degrees.
4. The arrangement according to any of the preceding embodiments, wherein the truncated cone is a right cone.
5. The arrangement according to any of the preceding embodiments, wherein the slant height 65 of the truncated cone is at least 40% of the top surface diameter 66.
6. The arrangement according to any of the preceding embodiments, wherein the lateral surface of the locking pin has a radially extending recess 11, the recess having an inner sloping surface 12 axially towards the locking pin 2 and starting at an axial point 13 at the side of the recess opening closest to the end with the spring 1 of the locking pin.
7. The arrangement according to embodiment 6, wherein the recess 11 in the locking pin is a through hole such that there is a recess opening and a recess exit.
8. The arrangement according to any of the embodiments 6-7, wherein a width 62 of the recess 11 in the locking pin is between 30% and 70% of the diameter 61 of the locking pin and more preferably between 40% and 60% of the diameter of the locking pin.
9. The arrangement according to embodiment 7, wherein a height 63 of the recess opening in the locking pin in the axial direction is between 1.6 to 2.1 times as large as a height 64 of the recess exit on the opposite side of the locking pin 2.
10. The arrangement according to any of the embodiments 6-9, wherein the panel 15 with the first locking pin recess 21 has a service recess 23 in a direction perpendicular to the first locking pin recess 21 and arranged such that the two recesses 21, 23 connect at a distance below the contact surface of the panel 15.
11. The arrangement according to embodiment 10, wherein the service recess 23 extends beyond the first locking pin recess 21 such that the two recesses 21, 23 crosses.
12. The arrangement according to any of the preceding embodiments, wherein the second locking pin recess 22 has a beveled opening edge 24 at least along a part of its circumference.
13. The arrangement according to any of the preceding embodiments, wherein the recess 22 has conical shape corresponding to the truncated cone of the locking pin 2.
14. The arrangement according to any of the preceding embodiments, wherein the centre axis of the locking pin is perpendicular to the contact surface between the panels.
15. The arrangement according to any of the preceding embodiments, wherein the spring loaded locking pin 2 has two opposed radially projecting parts 14 at the end of the spring farthest away from the locking pin 2.

The invention claimed is:

1. A mechanical connection arrangement for panels comprising a first panel, a second panel wherein a surface of the first panel and a surface of the second panel are parallel and in contact in a locked position of the first and second panels, the connection arrangement comprising first and second rod-shaped elements at the surface of the first panel and first and second corresponding insertion recesses at the surface of the second panel,
wherein the first rod-shaped element is configured to be inserted in the first insertion recess, and the second rod-shaped element is configured to be inserted in the second insertion recess,
wherein the first and second rod-shaped elements extend at a first angle from the surface of the first panel and the first and second insertion recesses extend into the second panel at a second angle from the surface of the second panel,
wherein both the first and second angles are in the range of about 30° to about 60°,
wherein a difference between the first angle and the second angle is at least 0.5°,
wherein the connection arrangement comprises a locking device which comprises a locking pin at one end and a spring at another end,
wherein the spring is configured to cooperate with a first panel recess in one of the panels and the locking pin is configured to cooperate with a second panel recess in the other panel when the arrangement is in a connected state, and
wherein an end part of the locking pin is cone shaped, an envelope surface of the cone shaped end part comprises a pin locking surface which in the connected state is configured to cooperate with a recess locking surface of the second panel recess,
wherein a lateral surface of the locking pin comprises a radially extending recess, the radially extending recess being a through opening, the radially extending recess having an inner sloping surface configured to be engaged with an unlocking tool.

2. The mechanical arrangement according to claim 1, wherein the difference between the first angle and the second angle is between 0.5° and 3°.

3. The mechanical arrangement according to claim 1, wherein the slant angle of the truncated cone is between 3° and 20°.

4. The mechanical arrangement according to claim 1, wherein the truncated cone is a right cone.

5. The mechanical arrangement according to claim 1, wherein the slant height of the truncated cone is at least 40% of the top surface diameter.

6. The mechanical arrangement according to claim 1, wherein the second panel recess comprises a bevel at an opening of the second panel recess, wherein the bevel extend at least along a part of a circumference of the second panel recess.

7. The mechanical arrangement according to claim 1, wherein the recess has a conical shape corresponding to the cone shape of the locking pin.

8. The mechanical arrangement according to claim 1, wherein longitudinal center axis of the locking pin is perpendicular to the contact surface between the panels.

9. The mechanical arrangement according to claim 1, wherein the spring comprises two opposed radially projecting parts at an end of the spring farthest away from the locking pin.

10. The mechanical arrangement according to claim 1, wherein a longitudinal direction of the locking pin is at an angle relative the contact surface between the two panels, wherein the angle is in a range from about 85° to about 95°.

11. A mechanical connection arrangement for panels comprising a first panel, a second panel wherein a surface of the first panel and a surface of the second panel are parallel and in contact in a locked position of the first and second panels, the connection arrangement comprising first and second rod-shaped elements at the surface of the first panel and first and second corresponding insertion recesses at the surface of the second panel, wherein the first rod-shaped element is configured to be inserted in the first insertion recess, and the second rod-shaped element is configured to be inserted in the second insertion recess, wherein the first and second rod-shaped elements extend at a first angle from the surface of the first panel and the first and second insertion recesses extend into the second panel at a second angle from the surface of the second panel, wherein both the first and second angles are in the range of about 30° to about 60°, wherein the connection arrangement comprises a locking device which comprises a locking pin at one end and a spring at another end, wherein the spring is configured to cooperate with a first panel recess in one of the panels and the locking pin is configured to cooperate with a second panel recess in the other panel when the arrangement is in a connected state, and wherein an end part of the locking pin is cone shaped, an envelope surface of the cone shaped end part comprises a pin locking surface which in the connected state is configured to cooperate with a recess locking surface of the second panel recess, wherein a lateral surface of the locking pin comprises a radially extending recess, the recess having an inner sloping surface axially towards the end part of the locking pin and starting at an axial point at a side of a recess opening closest to the end with the spring.

12. The mechanical arrangement according to claim 11, wherein the recess of the locking pin is a through hole such that there is a recess opening and a recess exit.

13. The mechanical arrangement according to claim 12, wherein a height of the recess opening, in the axial direction, is between 1.6 to 2.5 times as large as a height of the recess exit on the opposite side of the locking pin.

14. The mechanical arrangement according to claim 11, wherein a width of the recess of the locking pin is between 30% and 70% of a diameter of the locking pin.

15. The mechanical arrangement according to claim 11, wherein the panel with the first panel recess has a service recess in a direction perpendicular to the first panel recess and arranged such that the two recesses connect at a distance below the contact surface of the panel.

16. The mechanical arrangement according to claim 15, wherein the service recess extends beyond the first panel recess such that the two recesses cross.

17. A mechanical connection arrangement for panels comprising a first panel, a second panel wherein a surface of the first panel and a surface of the second panel are parallel and in contact in a locked position of the first and second panels, the connection arrangement comprising first and second rod-shaped elements at the surface of the first panel and first and second corresponding insertion recesses at the surface of the second panel, wherein the first rod-shaped element is configured to be inserted in the first insertion recess, and the second rod-shaped element is configured to be inserted in the second insertion recess, wherein the first and second rod-shaped elements extend at a first angle from the surface of the first panel and the first and second insertion recesses extend into the second panel at a second angle from the surface of the second panel, wherein both the first and second angles are in the range of about 30° to about 60°, wherein the connection arrangement comprises a locking device which comprises a locking pin at one end and a spring at another end, wherein the spring is configured to cooperate with a first panel recess in one of the panels and the locking pin is configured to cooperate with a second panel recess in the other panel when the arrangement is in a connected state, wherein an end part of the locking pin comprises a pin locking surface which in the connected state is configured to cooperate with a recess locking surface of the second panel recess, and wherein a lateral surface of the locking pin comprises a radially extending recess, the recess having an inner sloping surface axially towards the end part of the locking pin and starting at an axial point at a side of a recess opening closest to the end with the spring.

18. The mechanical arrangement according to claim 17, wherein the end part of the locking pin comprises an envelope surface which comprises the pin locking surface.

19. The mechanical arrangement according to claim 17, wherein the recess of the locking pin is a through hole such that there is a recess opening and a recess exit.

20. The mechanical arrangement according to claim 19, wherein a height of the recess opening, in the axial direction, is between 1.6 to 2.5 times as large as a height of the recess exit on the opposite side of the locking pin.

21. The mechanical arrangement according to claim 17, wherein a width of the recess of the locking pin is between 30% and 70% of a diameter of the locking pin.

22. The mechanical arrangement according to claim 17, wherein the panel with the first panel recess has a service recess in a direction perpendicular to the first panel recess and arranged such that the two recesses connect at a distance below the contact surface of the panel.

23. The mechanical arrangement according to claim 22, wherein the service recess extends beyond the first panel recess such that the two recesses cross.

\* \* \* \* \*